(12) United States Patent
Han et al.

(10) Patent No.: US 6,549,983 B1
(45) Date of Patent: Apr. 15, 2003

(54) CACHE MEMORY SYSTEM AND METHOD FOR MANAGING THE SAME

(75) Inventors: Tack-don Han, Kyungki-do (KR); Gi-ho Park, Seoul (KR); Shin-dug Kim, Kyungki-do (KR)

(73) Assignee: Samsung Electronics Co., Ltd., Kyungki-do (KR)

( * ) Notice: Subject to any disclaimer, the term of this patent is extended or adjusted under 35 U.S.C. 154(b) by 0 days.

(21) Appl. No.: 09/315,781

(22) Filed: May 20, 1999

(30) Foreign Application Priority Data

May 20, 1998 (KR) .............................. 98-18198

(51) Int. Cl.[7] .............................. G06F 12/08
(52) U.S. Cl. ............... 711/120; 711/122; 711/128; 711/133; 711/143; 711/144
(58) Field of Search .................. 711/120, 122, 711/128, 133, 143, 144

(56) References Cited

U.S. PATENT DOCUMENTS

| | | | | |
|---|---|---|---|---|
| 5,136,700 A | * | 8/1992 | Thacker .................. | 711/122 |
| 5,909,697 A | * | 6/1999 | Hayes et al. ............ | 711/144 |
| 6,202,125 B1 | * | 3/2001 | Patterson et al. ........ | 711/118 |

OTHER PUBLICATIONS

Gonzalez, Antonio et al., "A Data Cache with Multiple Caching Strategies Tuned to Different Types of Locality", Proceedings of the 9th ACM International Conference on Supercomputing, 7/95;pp 338–347.*

Milutinovic et al., "A New Cache Architecture Concept: The Split Temporal/Spatial Cache", Electrotechnical Conference 1996, MELECON '96; pp. 1108–1111.*

Lee et al., "A Selective Temporal and Aggressive Spatial Cache System based on Time Interval", 2000 Internation Conference on Computer Design, 9/2000; pp. 287–293.*

* cited by examiner

*Primary Examiner*—Reginald G. Bragdon
(74) *Attorney, Agent, or Firm*—Harness, Dickey & Pierce, P.L.C.

(57) ABSTRACT

A cache memory system reduces the rate of cache misses. The cache memory system includes a first auxiliary storage device which stores first information blocks and a second auxiliary storage device which stores second information blocks fetched from a lower level memory device. Each second block includes a plurality of the first information blocks. A process for fetching information selectively fetches a first or second information block from the lower level memory device and selectively stores the fetched block in the first auxiliary storage device and/or the second auxiliary storage device. Selection of the size of block to fetch and where to store the fetched block is according to whether the data to be referenced by the central controller is in the first auxiliary storage device or the second auxiliary storage device and whether first information blocks that do not include the referenced data are both in the second information block including the referenced data and in the first auxiliary storage device. A control unit that controls the selective fetching and storing maintains state data that includes entries corresponding to second information blocks. Each entry identifies a corresponding second information block and indicates the number of first information blocks that are in the first auxiliary storage device and from the corresponding second information block.

21 Claims, 7 Drawing Sheets

FIG. 8

| VARIABLE | | SET VALUE |
|---|---|---|
| CENTRAL CONTROLLER CLOCK FREQUENCY | | 400MHz |
| CACHE SIZE | | 8-256 KBYTES |
| BLOCK SIZE | SOC | 64-512 BYTES |
| | TOC | 16-64 BYTES |
| ASSOCIATIVITY | SOC | 1, 4, 8 WAY |
| | TOC | 1, 2, 4 WAY |
| MEMORY ACCESS LATENCY | | 100ns (40 CPU CYCLES) |
| TRANSFER RATE | | 1.6, 6.4 GBYTE/SEC (4, 6 BYTES/CPU CYCLES) |
| BANDWIDTH | | 1.6 GBYTES/SEC |
| | | 6.4 GBYTES/SEC |

CACHE MEMORY SYSTEM AND METHOD FOR MANAGING THE SAME

BACKGROUND OF THE INVENTION

1. Field of the Invention

The present invention relates to cache memory systems and methods for managing cache memory systems, and more particularly, to improving performance of a cache memory system by reducing cache misses.

2. Description of the Related Art

In a typical computer system, the memory hierarchy as illustrated in FIG. 1 includes a register set 10 in a processor, a cache system 11, a main memory 12, a disk drive 13, and a magnetic tape driver 14 used as a back-up device. In the respective devices of the memory hierarchy, upper layers such as register set 10 have higher operating speeds but store less information than lower layers such as disk drive 13 or tape drive 14. Most high-performance computer systems improve performance by appropriately setting the sizes, structures, and operation methods of register set 10 and cache system 11.

The hierarchical memory system using cache system 11 can obtain excellent performance by basing the operation of cache system 11 on the property of locality. Programs accessing memory typically demonstrate two types of locality, spatial locality and temporal locality. Spatial locality refers to the tendency of accesses of adjacent memory locations to be close together in time. Temporal locality refers to the high probability that a program will access recently accessed items again in the near future. Caches exploit temporal locality by retaining recently referenced data and exploit spatial locality by fetching multiple neighboring words as a cache line or block whenever a cache miss occurs.

The two types of localities serve as important elements in determining the size of a cache block when designing a cache. Large cache blocks take advantage of spatial locality, while many smaller cache blocks better exploit temporal locality. However, the approaches for exploiting spatial or temporal locality contradict each other. In particular, increasing the block size improves the chance that adjacent data adjacent the most recent access will be in the cache but in a fixed-sized cache, also decreases of the number of cache blocks and the number of recently access data items in the cache.

FIG. 2 conceptually illustrates spatial locality of a cache. In FIG. 2, X and Y axes respectively denote memory addresses and the access probability following an access of a memory address A. The probability function of FIG. 2 is not accurate but does illustrate spatial locality where the probability of accessing an address decreases as the distance from the last address accessed.

FIG. 2 also illustrates aspects of different choices of cache block sizes. If a large block 22 is fetched for a cache miss, miss-to-hit ratio may decrease because of the spatial locality of accesses. However, the mean expected utilization of elements in a cache block is low for a large block because the probability of accessing addresses drops with distance from memory address A. If a small block 20 is fetched for a cache miss, the mean expected utilization of elements in the cache block 20 is greater because the addresses of elements in the cache block 20 are all close to the last accessed address A. Also if software tends to access several spatially separated memory locations on a regular basis, cache block 20 being smaller allows representation of more data locations in a fixed-sized cache system and thereby reduces cache misses for programs having a greater tendency for temporal locality.

For any specific cache size, selection of a cache block size involves a trade-off between the exploitation of spatial and temporal locality. Considering this effect, studies have investigated the optimal size of a cache block for a given cache capacity. Caches constructed with the optimal block size perform well, but this performance is highly dependent on the memory access patterns of executed programs. Some programs perform best with cache blocks of a specific block size, while other programs suffer severe performance degradation when a cache uses the same block size. To solve this problem, a dual data cache can include the spatial cache and the temporal cache which have different cache block sizes to respectively exploit the spatial locality and the temporal locality of memory accesses. One dual cache operating method classifies different accesses as having primarily spatial locality or primarily temporal locality and fetches blocks of information into the cache (spatial or temporal) which exploits that type of locality.

FIG. 3 shows the structure of a dual cache memory. This dual cache memory system is according to a study described in "International Conference On Supercomputing ICS '95," pages 338–347. The cache of FIG. 3 includes a memory device 34 that stores information for a central processing unit (CPU) 33, a spatial cache 30, a temporal cache 31, a prediction table 32 for determining whether to store the information from the memory device 34 in spatial cache 30 or temporal cache 31, a multiplexer 35 for selecting spatial cache 30 or temporal cache 31 when CPU 33 accesses the information, and a demultiplexer 36 that is under control of prediction table 32 and directs information from memory device 34 to spatial cache 30 or temporal cache 31. In the study of the above structure, prediction table 32 determines which cache 30 or 31 receives the information fetched from memory device 34. Accordingly, the performance is improved when prediction table 32 selects the appropriate cache 30 or 31.

The entries in prediction table 32 select cache 30 or 31 based on factors such as an instruction address, a last accessed address, a stride, a length, a current state, and a predicted value. Prediction table 32 obtains the stride using a difference between addresses of data accessed by the same instruction, and the stride indicates or selects the cache 30 or 31 for storage of information fetched from memory device 34 for the instruction. For example, assuming that one execution of an instruction at an address A references or accesses data at an address B, and the next execution of the instruction at address A accesses data at an address B+$\alpha$. When a following execution of the instruction at address A accesses information at an address B+2$\alpha$, prediction table 32 determines that the instruction at address A has uniform stride a. The information fetched for the instruction at address A is stored in either spatial cache 30 or temporal cache 31 according to the value of stride a. Accordingly, an entry in prediction table 32 corresponds to an instruction and indicates the instruction's address and selects a cache 30 or 31 when the instruction requires data from memory device 34. In particular, searching prediction table 32 by instruction address locates the entry that indicates either cache 30 or 31. The address of the information that the instruction accessed can be stored in the another address field of the entry. A difference between the address of currently accessed data and the address of previously accessed data by the instruction is stored in a stride field of the entry in prediction table 32. For example, when a uniform stride separates three accessed addresses such as B, B+α, and B+2α, it is possible to predict whether spatial cache 30 or temporal cache 31 is more efficient for future accesses by the instruction. Thus, storing the information in spatial cache 30 or temporal cache 31 according to the type However, the cache memory system of FIG. 3 has many accesses that do not have the uniform stride, and the stride of the addresses accessed by the same instruction may change. Accordingly, improving the performance of the cache system of FIG. 3 is difficult when instructions do not have uniform strides for data accesses.

SUMMARY OF THE INVENTION

To solve the above problem, a method for managing a cache memory selectively determines the amount of information fetched during a cache miss according to the state of information in a cache and selectively stores fetched information so that information having a high probability of being accessed stays in the cache longer than information having a low probability of being accessed. Thus, the frequency of cache misses is reduced and the efficiency of memory traffic is improved.

In accordance with one embodiment of the invention, a cache memory includes: lower level memory device that stores information for a central controller; a first auxiliary storage device that stores first information blocks; and a second auxiliary storage device that stores second information blocks. Operating the cache system includes selectively fetching a first information block or a second information block as a fetched block from the lower level memory device and selectively storing the fetched information block in the first auxiliary storage device or the second auxiliary storage device. Selection of whether the fetched block is a first or second information block is according to whether a first information block that does not include the target data being accessed but is included in the second information block that includes the target data is in the first auxiliary storage device. The first and second information blocks are respectively of a first or second size, which are different from each other and selected to respectively take advantage of temporal locality and spatial locality in memory accesses. Accordingly, selectively fetching and storing information blocks in the first auxiliary storage device and/or the second auxiliary storage device allows the first auxiliary storage device to perform well with programs exhibiting temporal locality and allows the second auxiliary storage device to perform well with programs exhibiting spatial locality. Overall performance is thus improved.

In the above, the cache system further includes a state storage device having state information showing the numbers of first information blocks included in specific second information blocks and stored in the first auxiliary storage device. Using the state information, the above selectively fetching and storing involves: determining whether the target data being accessed by the central controller is in the first auxiliary storage device or the second auxiliary storage device; accessing the target data from the first auxiliary storage device when the data is in the first auxiliary storage device; copying into the first auxiliary storage device, a first information block that includes the target data and is from the second information block including the target data being accessed and when the target data is not in the first auxiliary storage device but is in the second auxiliary storage device; determining whether a first information block which does not include the target data but is included in the second information block that includes the target data is in the first auxiliary storage device; fetching the first information block including the target data from the lower level memory device and storing that first information block in the first auxiliary storage device when the first information that does not include the target data and is included in the second information block including the target data item is in the first auxiliary storage device; and fetching the second information block including the target data from the lower level memory device, storing that second information block in the second auxiliary storage device, and copying the first information block including the target data from the second information block in the second auxiliary storage device to the first auxiliary storage device when the first information block that does not include the target data and is included in the second information block including the target data is not in the first auxiliary storage. The state information is updated after the first information block containing the target data is stored in the first auxiliary storage device. The central controller can access the target data from the second auxiliary storage device or the first auxiliary storage device after the block containing the target date is copied to the first auxiliary storage device from the second auxiliary storage device.

Alternatively, selectively fetching and storing includes: determining whether the target data to be referenced by the central controller is in the first auxiliary storage device or the second auxiliary storage device, referencing the target data from the first auxiliary storage device when the target data is in the first auxiliary storage device, copying a first information block including the target data to the first auxiliary storage device, from the second information block in the second auxiliary storage device when the target data is not in the first auxiliary storage device but is in the second auxiliary storage device, determining whether the second information block including the target data is in a lower level memory device when the target data is in neither the first auxiliary storage device nor the second auxiliary storage device, fetching the first information block including the target data from the lower level memory device and storing the first information in the first auxiliary storage device when the second information block including the target data is in the lower level memory device, and fetching the second information block including the target data from another lower level memory device, storing the second information block in the second auxiliary storage device, and copying the first information block including the target data from the second information block stored in the second auxiliary storage device to the first auxiliary storage device when the second information block including the target data is not in the first lower level memory device.

Alternatively, selectively fetching and storing includes: providing a state storage device having state information showing the numbers of first information blocks included in specific second information blocks and stored in the first auxiliary storage device, determining whether the target data referenced by the central controller is in the first auxiliary storage device or the second auxiliary storage device; referencing the target data from the first auxiliary storage device when the target data is in the first auxiliary storage device; copying the first information block including the target data from a second information block stored in the second auxiliary storage device to the first auxiliary storage device when the target data is not in the first auxiliary storage device but is in the second auxiliary storage device; determining how many first information blocks that do not include the target data and are in the second information block including the target data are in the first auxiliary storage device when the target data is in neither the first auxiliary storage device nor the second auxiliary storage device; fetching the first information block including the target data from the lower level memory device and storing that first information block in the first auxiliary storage device when no less than a specific upper limit of first information do not include the target data, are in the second information block including the target data, and are in the first auxiliary storage device; and fetching the second information block including the target data item from the lower level memory device, storing that second information block in the second auxiliary storage device, and copying the first information block including the target data from the second auxiliary storage device to the first auxiliary storage device when less than the specific upper limit of the first information blocks do not include the target data are included in the second information block including the target data, and are in the first auxiliary storage device.

In accordance with another embodiment of the invention, a cache memory system for storing some information referenced by a central controller of a computer system from information stored in a lower level memory device, includes a second auxiliary storage device that stores second information blocks that are fetched from the lower level memory device, a first auxiliary storage device in that stores first information blocks fetched from the second auxiliary storage device or the lower level memory device, and a control unit that selectively fetches the first information block or the second information block that contains target data from the lower level memory device and selectively stores the first or second information block in the first auxiliary storage device and/or the second auxiliary storage device. The control unit operates according to whether the target data is in the first auxiliary storage device or the second auxiliary storage device and whether a first information block which does not include the target data is included in the second information block including the target data and is in the first auxiliary storage device.

The control unit includes a state storage device for state information showing the numbers of first information blocks included in specific second information blocks and stored in the first auxiliary storage device and a demultiplexer for routing the fetched block to the first auxiliary storage device or the second auxiliary storage device for storage. The control unit controls the demultiplexer according to the state information of the state storage device.

In accordance with another embodiment of the invention, a method for managing a cache memory includes: providing information in a lower level memory device for a central controller; providing a first auxiliary storage device that stores first information blocks and a second auxiliary storage device that stores second information blocks; determining whether target data to be referenced by the central controller is in the first auxiliary storage device or the second auxiliary storage device, referencing the target data from the first auxiliary storage device when the target data is in the first auxiliary storage device; copying to the first auxiliary storage device a first information block including the target data from a second information block that includes the target data and is stored in the second auxiliary storage device when the target data is not in the first auxiliary storage device but is in the second auxiliary storage device; fetching the second information block including the target data item, storing that second information block in the second auxiliary storage device, and copying the first information block including the target data from the second information block in the second auxiliary storage device to the first auxiliary storage device when the target data is in neither the first auxiliary storage device nor the second auxiliary storage device; and when a first information block stored in the first auxiliary storage device is replaced, updating a first information block included in a second information block stored in a second auxiliary storage device only when the second information block including replaced first information is stored in the second auxiliary storage device, the replaced first information block is modified in the first auxiliary storage device, and the replaced first information block has a value different from that of first information block included in the second information block stored in the second auxiliary storage device.

BRIEF DESCRIPTION OF THE DRAWINGS

The operation and advantages of the present invention will become more apparent by describing in detail an embodiment thereof with reference to the attached drawings in which:

FIG. 8 shows the system parameters for a performance evaluation of an embodiment of the present invention.

Use of the same reference symbols in different figures indicates similar or identical items.

DETAILED DESCRIPTION

Figure 1:
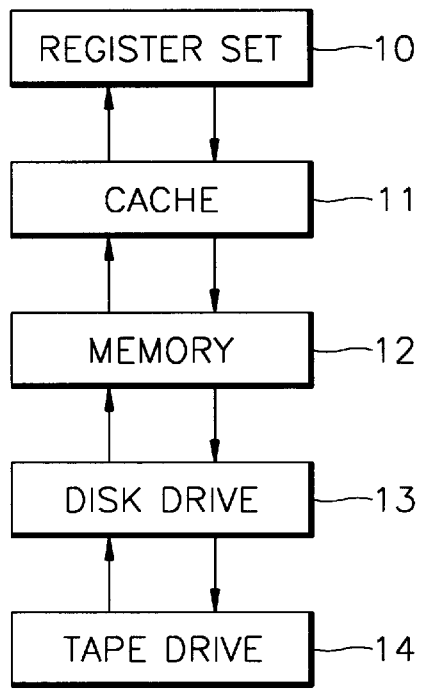
FIG. 1 shows a hierarchical memory structure.
Figure 2:
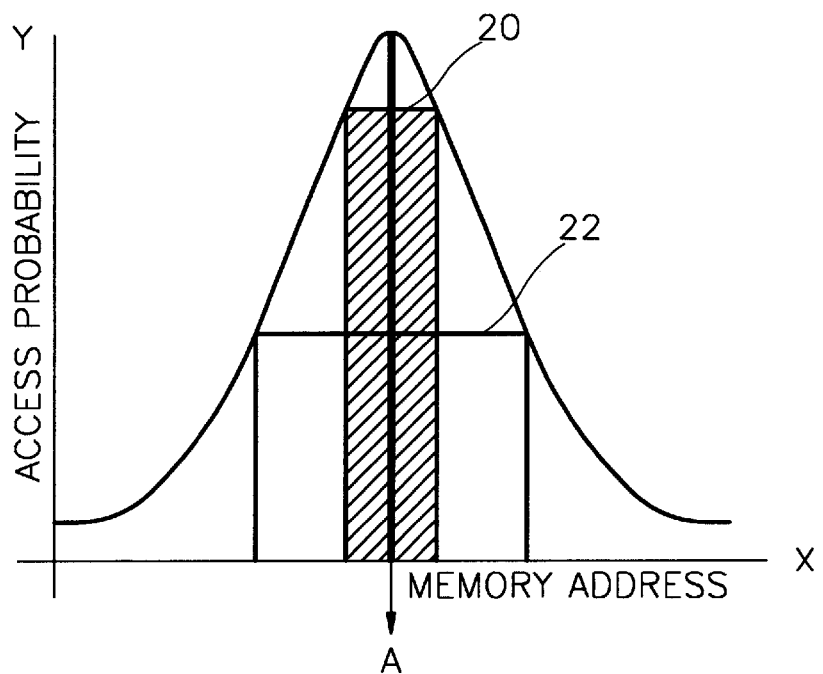
FIG. 2 illustrates spatial locality of a program.
Figure 3:
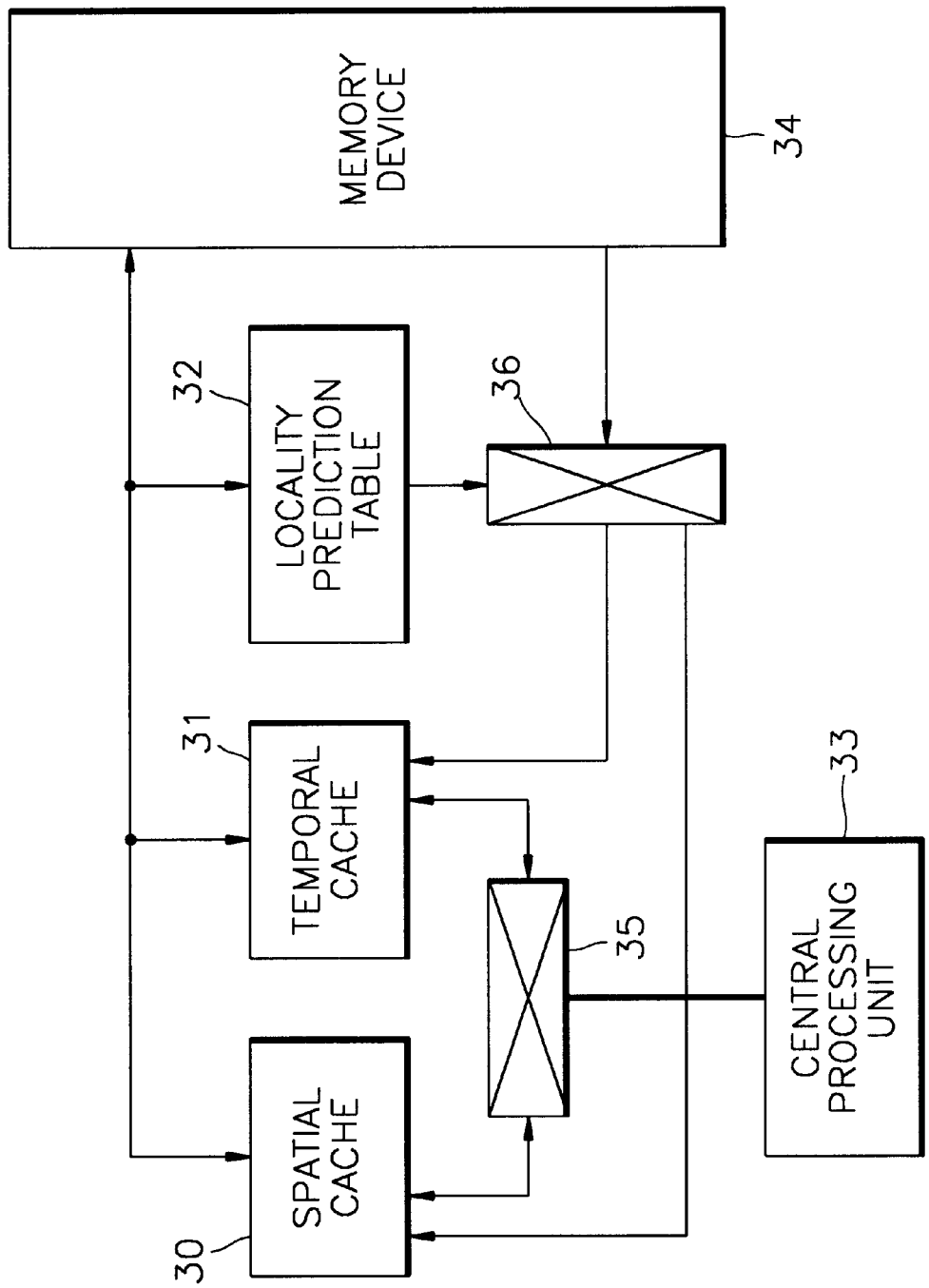
FIG. 3 is a block diagram of a known cache memory system.
Figure 4A:
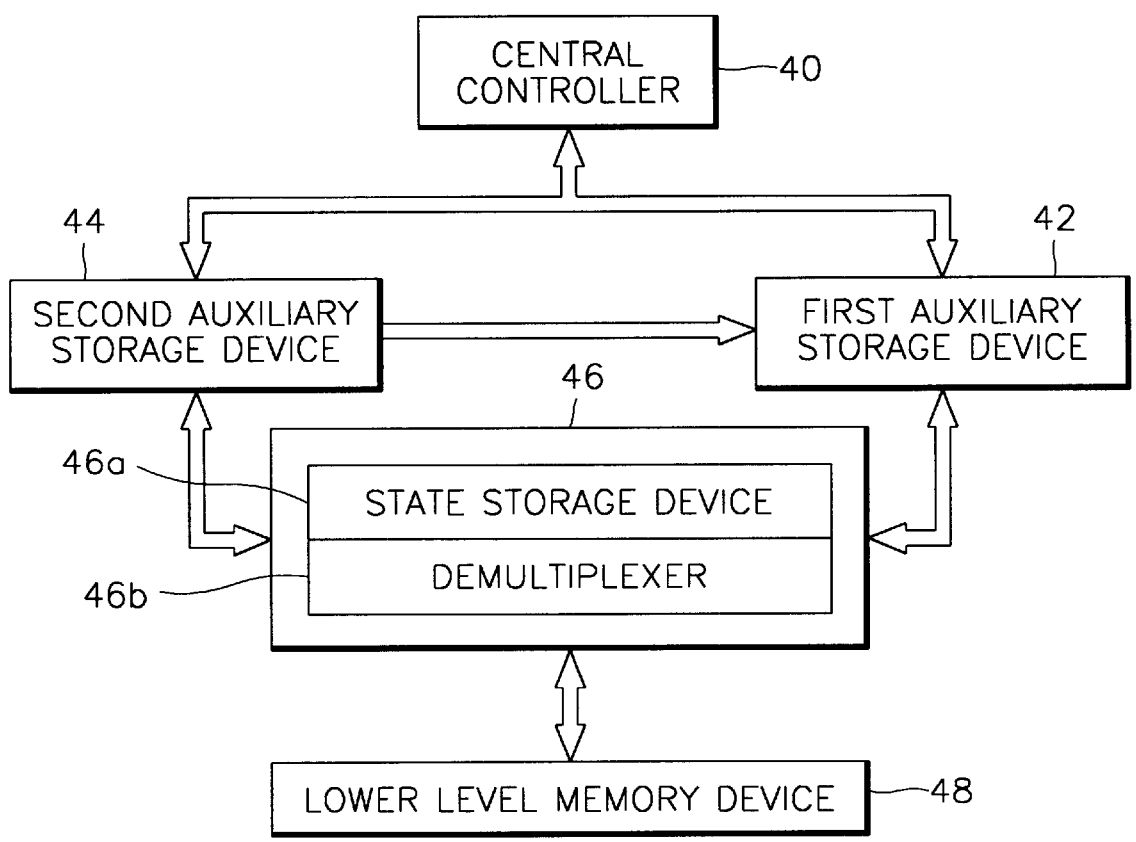
FIG. 4A is a block diagram of a cache memory system according to an embodiment of the present invention.

FIG. 4A is a block diagram of a cache memory system according to an embodiment of the present invention. In FIG. 4A, the cache memory system includes a central controller 40, a lower level memory device 48, a first auxiliary storage device 42, a second auxiliary storage device 44, and a control unit 46. Lower level memory device 48, which may be any combination of memory devices such as a tape backup, a disk drive, a main memory, and a cache in a memory hierarchy stores a relatively large amount of information for central controller 40. First and second auxiliary storage devices 42 and 44 are cache memories which store a fraction of the information in lower level memory device 48. More particularly, first auxiliary storage device 42 is a cache memory containing cache blocks of a first block size Btoc, and second auxiliary storage device 43 is a cache memory containing cache blocks of a second block size Bsoc which is larger than first block size Btoc.

Central controller 40 can access (i.e., read or write) data that is in first or second auxiliary storage device 42 or 44 without the need to access the slower, lower level memory device 48. However, when central controller 40 attempts to access information that is not in storage device 42 or 44, a cache miss occurs, and control unit 46 fetches from lower level memory device 48 an information block that includes the target data that the central controller 40 is attempting to access. The fetched information block from the lower level memory device 48 has either the first block size or the second block size. Control unit 46 stores information blocks of the first block size in first auxiliary storage device 42 and stores blocks of the second block size in second auxiliary storage device 44.

Figure 4B:
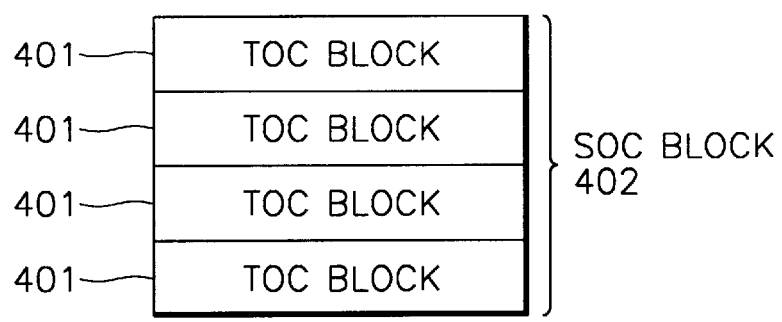
FIG. 4B illustrates a relationship between TOC information blocks and an SOC information block according to the present invention.

FIG. 4B shows an information block 402 of second block size Bsoc which may be found in lower memory device 48 or second auxiliary storage device 44. Information blocks of the second block size are sometimes referred to herein as SOC blocks. Information block 402 includes a plurality of information blocks 401 of first block size Btoc. Information blocks of the first block size are sometimes referred to herein as TOC blocks. If information block 402 contains data being accessed then one of information blocks 401 includes the data being accessed. Generally, when control unit 46 fetches information block 402 from lower level memory 48, control unit 46 stores information block 402 in second auxiliary memory 44 and stores in first auxiliary storage device 42, the information block 401 that contains the information that central controller 40 is accessing.

Control unit 46 includes a state storage device 46a and a demultiplexer 46b with associated control logic (not shown). State storage device 46a stores state information for SOC blocks. As described further below, the state information includes the number of TOC blocks that are in a specific SOC block and are stored in first auxiliary storage device 42. Control unit 46 uses demultiplexer 46b to direct information selectively to first auxiliary storage device 42 or second auxiliary storage device 44. Control unit 46 uses the state information in state storage device 46a when controlling demultiplexer 46b. Generally, when control unit 46 fetches an SOC block from lower level memory device 48 and stores the SOC block in second auxiliary storage device 44, the TOC block that is a subset of the SOC block and includes the information being accessed is copied in first auxiliary storage device 42.

Figure 5:
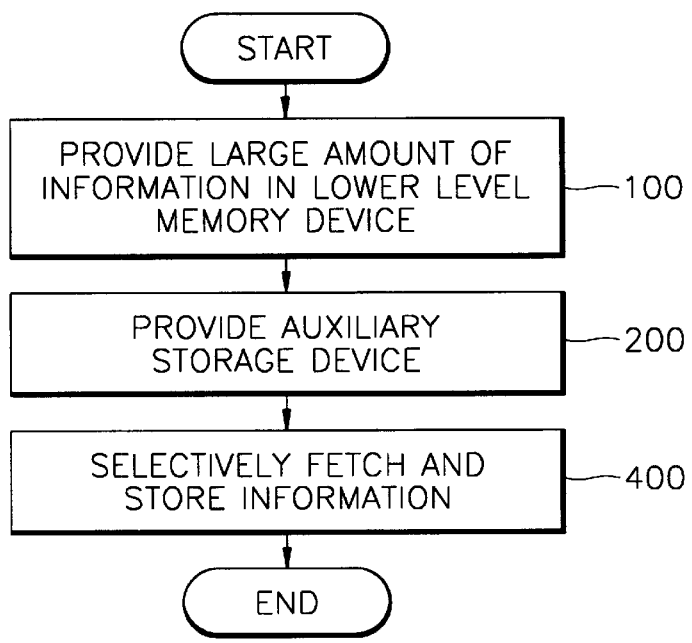
FIG. 5 is a flowchart of the operation of the cache memory system of FIG. 4A.

FIG. 5 illustrates the overall strategy of the cache system of FIG. 4A. As illustrated in FIG. 5, a large amount of data is stored in the lower level memory device 48 which is, for example, the main memory, a cache memory, or another portion of a hierarchical memory structure (step 100). The information stored in lower level memory device 48 is for the CPU or central controller 40 which is the CPU.

First auxiliary storage device 42 stores information in units of TOC blocks, and second auxiliary storage device 44 stores information in units of SOC blocks which were fetched from lower level memory device 48. Auxiliary storage devices 42 and 44 connect to central controller 40 which can access the data stored in auxiliary storage devices 42 and 44(step 200).

Control unit 46 operates in response to cache misses that result when neither auxiliary storage device 42 nor 44 contains the target data that central controller 40 is accessing. In response to a cache miss, control unit 46 selectively fetches an SOC block or a TOC block from lower level memory device 48 and selectively stores fetched information in first auxiliary storage device 42 and/or second auxiliary storage device 44 (step 400). Storage is according to whether the data being accessed is in first auxiliary storage device 42 or second auxiliary storage device 44 and whether first auxiliary storage device 42 contains a TOC block that does not include the target data being accessed but is in an SOC block which includes the data being accessed.

In accordance with one embodiment of the invention, first auxiliary storage device 42 is a temporal oriented cache (TOC) memory primarily constructed to exploit temporal locality of accessed information. Second auxiliary storage device 44 is a spatial oriented cache (SOC) memory primarily constructed to exploit spatial locality of accessed information. Thus, the first and second block sizes Btoc and Bsoc are selected to respectively exploit temporal locality and spatial locality. Preferably, first block size Btoc, which first auxiliary storage device 42 uses, is in a range of from 16 to 64 bytes, and second block size Bsoc, which second auxiliary storage device 44 uses, is in a range of from 64 to 512 bytes. The second block size Bsoc is preferably a multiple of two times first block size Btoc. For example, when first block size Btoc is 16 bytes of information, second block size Bsoc is 64 bytes, which is four times the first block size. As a preferred embodiment, the basic unit of information of first auxiliary storage device 42, which is read from lower level memory device 48 and is stored, is 32 bytes. The basic unit of information of second auxiliary storage device 44 is 128 bytes, four times the size of the TOC blocks in first auxiliary storage device 42. However, the sizes of the respective information blocks can vary according to the capacity of auxiliary storage devices 42 and 44.

The second block size Bsoc, which is the size of an SOC block, is larger than the first block size Btoc, which is the size of a TOC block, and the number of the SOC blocks that second auxiliary storage device 44 can store is smaller than the product of the number of the TOC blocks that first auxiliary storage device 42 can store times a ratio of the associativity of second auxiliary storage device 44 to the associativity of first auxiliary storage device 42. For example, if the number of TOC blocks that first auxiliary storage device 42 can store is 512, the associativity of second auxiliary storage device 44 is 8, and the associativity of first auxiliary storage device 42 is 1, then the number of SOC blocks that second auxiliary storage device 44 can store is less than 4096, which is the value obtained by multiplying 512 by 8.

When the number of SOC blocks in the second auxiliary storage device 44 is small, the number of the memory blocks mapped to a cache block increases. Accordingly, many cache conflict misses may be generated. To prevent the performance of the cache system from deteriorating due to the cache conflict misses, the associativity of second auxiliary storage device 44 can be made larger than the associativity of first auxiliary storage device 42.

Figure 6:
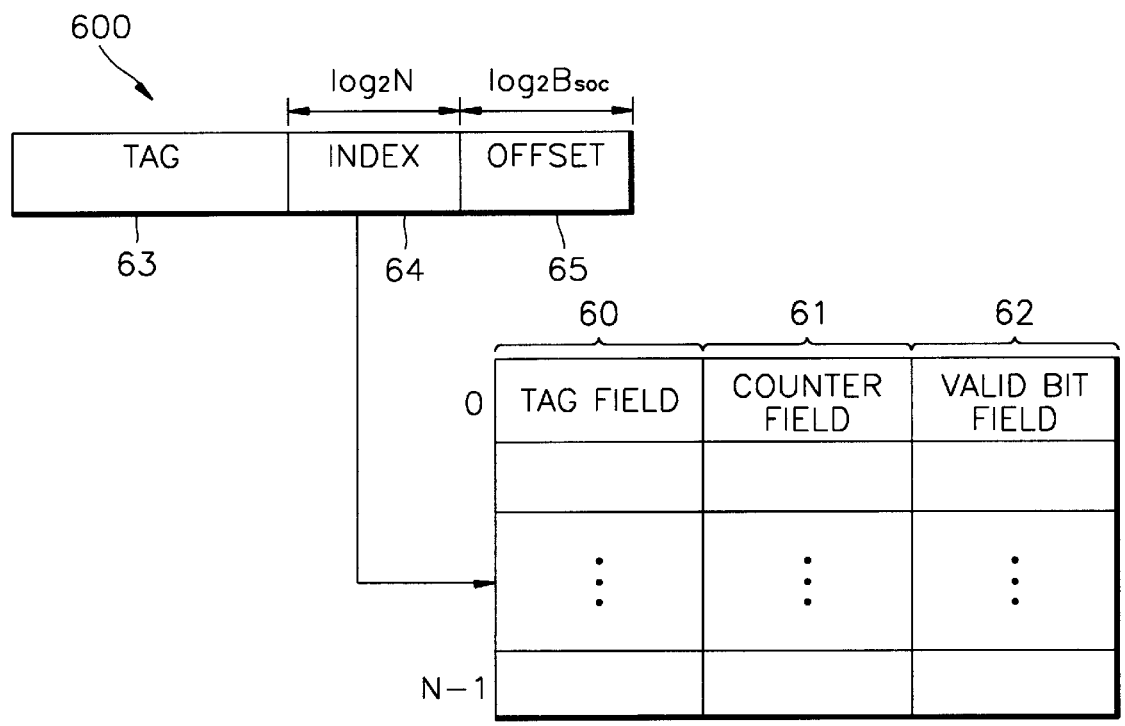
FIG. 6 shows a state storage device and a cache miss address according to an embodiment of the present invention.

FIG. 6 shows a state storage device and a cache miss address 600 according to the present invention. FIG. 6 illustrates an exemplary embodiment where the state storage device 46a has N entries that are directly mapped according to cache miss address 600. Preferably, the number N of entries in state storage device 46a is the number of TOC blocks that can be stored in first auxiliary storage device 42. In state storage device 46a, each entry corresponds to an SOC block and includes a tag field 60, a counter field 61, and a valid bit field 62. Tag field 60 stores a tag for the corresponding SOC block. Counter field 61 stores a value from indicating the number of TOC blocks stored in first auxiliary storage device 42 that are also subsets of the SOC block corresponding to the entry. Valid field 62 contains flag values indicating whether the entry is valid and/or whether the SOC block corresponding to the entry is stored in second auxiliary storage device 44 and valid.

Control unit 46 receives cache miss address 600, which identifies data that central controller 40 is accessing. The $\log_2 B_{soc}$ least significant bits (where $B_{soc}$ is the second block size for second auxiliary storage device 44) of cache miss address 600 provide an offset 65 within an SOC block. The next $\log_2 N$ bits (where N is the number of entries of state storage device 46a) provide an index 64 for selecting an entry in state storage device 46a. The most significant bits of address 600 form a tag 63. (In an alternative embodiment, state storage device 46a instead of being a direct mapped, includes a CAM that uses both tag 63 and index 64 in a search for an entry corresponding to the SOC block matching cache miss address 600.)

When central controller 40 accesses information at address 600, state storage device 46a determines whether the entry that index 64 selects corresponds to an SOC block containing the information being accessed. In particular, control logic compares tag 63 of cache miss address 600 with the tag stored in tag field 60 of the entry of state storage device 46a selected by index 64. If tag 63 matches the value in tag field 60 of the identified entry, control unit 46 checks counter field 61 of the identified entry. When the value in the counter field 61 is 0, no TOC blocks in the corresponding SOC block are currently stored in first auxiliary storage device 42. When the value in counter field 61 is equal to or greater than 1, one or more TOC blocks are in the corresponding SOC block and stored in first auxiliary storage device 42.

Figure 7:
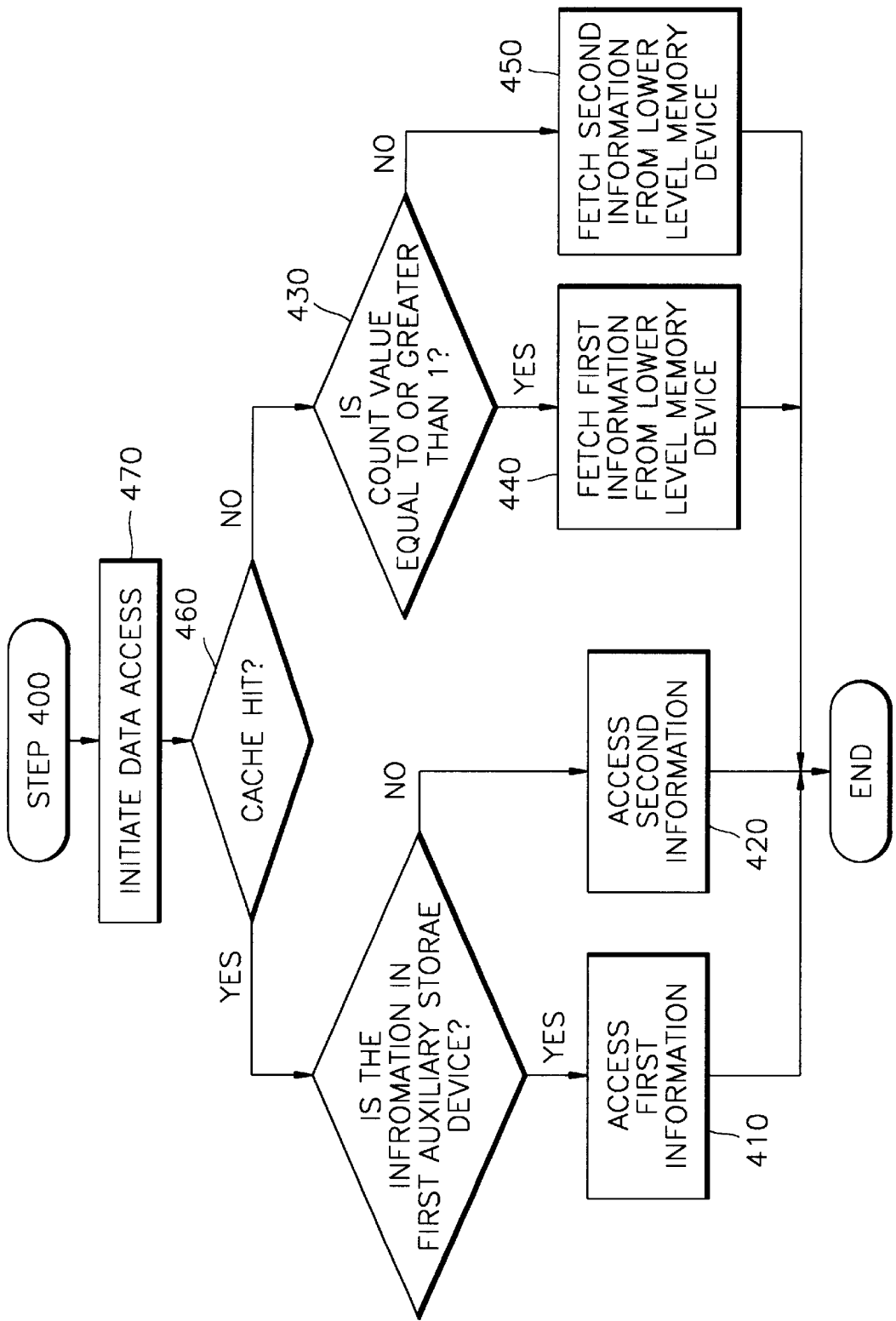
FIG. 7 is a flowchart showing an information access according to an embodiment of the present invention.

FIG. 7 is a flowchart showing a selective fetching and storing method according to an embodiment of the present invention. As shown in FIG. 7, the method includes the initial steps of starting a data access (step 470) and determining whether the data being accessed is in auxiliary storage device 42 or 44 (step 460). If the data is in auxiliary storage device 42 or 44, the method accesses the data from first auxiliary storage 42 if the data is in first auxiliary storage 42 (step 410), or from second auxiliary storage device 44 if the data is in second auxiliary storage device (step 420). If the data is in neither auxiliary storage device 42 nor 44, the method determines whether a count value corresponding to a SOC block is at least 1 (step 430) and fetches a TOC block of information from a lower level memory device if the count is greater than or equal to 1 (step 440) or fetches an SOC block of information from the lower level memory device if the count is less than 1 (step 450).

More specifically, in step 470, central controller 40 attempts to access data for a read or a write operation by providing the address of the data to first and second auxiliary storage devices 42 and 44. Step 460 then determines whether the data that central controller 40 is accessing is currently in first auxiliary storage device 42 or second auxiliary storage device 44. When the TOC block including the data being accessed is in first auxiliary storage device 42, central controller 40 accesses the data from the TOC block of the first auxiliary storage device 42 (step 410).

When the data that central controller 40 is accessing is not in first auxiliary storage device 42 but is in second auxiliary storage device 44, the TOC block including the data being accessed is copied from an SOC block in second auxiliary storage device 44 to first auxiliary storage device 42, and central controller 40 references the data from either first or second storage device 42 or 44 (step 420). After copying the TOC block from second auxiliary storage device 44 to first auxiliary storage device 42, control unit 46 updates the state information by increasing the count value stored in counter field 61 of the entry of state storage device 46a, that corresponds to the SOC block including the TOC block copied to first auxiliary storage device 42.

When no entry in state storage device 46a corresponds to the SOC block containing the data being accessed, a new entry is assigned, and the count value of counter field 61 is initialized to 1 to represent the TOC block newly stored in first auxiliary storage device 42. Tag field 60 from the cache miss address is stored in tag field of the entry. For direct mapping of state storage device 46a, the entry assigned to the SOC block is the entry that index 64 from cache miss address 600 identifies.

When the data being accessed is in neither first auxiliary storage device 42 nor second auxiliary storage device 44, control unit 46 examines the entry of the state storage device 46a that index 64 of cache miss address 600 identifies. If tag field 60 does not match tag 63 or the entry is invalid, a new entry is assigned to the SOC block by writing tag 63 equal to tag field 60. The count value of the new entry is set to zero, and process continues as indicated below for a count value of zero. If tag field 60 of the entry matches tag 63 of cache miss address 600, control unit 46 examines the count value in count field 61 of the entry. The count value of counter field 61 shows the number of TOC blocks included in the SOC block containing the data being accessed are stored in first auxiliary storage device 42. When the count value is 0 (or no entry of state storage device 46a corresponds to the SOC block including the data being accessed), first auxiliary storage device 42 does not contain a TOC block corresponding to the SOC block containing the data being accessed. When the count value equal to or greater than 1, at least one TOC block in first auxiliary storage device 42 is in the SOC block including the data being accessed.

When it is determined that first auxiliary storage device 42 stores one or more TOC block that does not include the data being accessed but is included in the SOC block including the data being accessed, control unit 46 fetches the TOC block that includes the data being accessed, from the lower level memory device 48 and stores in the fetched TOC block in first auxiliary storage device 42 (step 440). Central controller 40 access the data from the fetched TOC block from lower level memory device 48 and updates the state information by increasing the count value stored in counter field 61 of the entry corresponding to the SOC block including the fetched TOC block. Increasing the count value by 1 shows that the fetched TOC block has been added to first auxiliary storage device 42.

When no TOC block is included in both first auxiliary storage device 42 and the SOC block including the data being accessed, control unit 46 fetches the SOC block including the data from the lower level memory device 48 and stores in the fetched SOC block in second auxiliary storage device 44 (step 450). Further, the TOC block including the data being accessed is copied from the fetched SOC block to first auxiliary storage device 42. Then, the count value stored in counter field 61 of the entry of the state storage device 46a the fetched SOC block is increased by 1 to show that the TOC block is in first auxiliary storage device 42. Central controller 40 can access the data from either first or second auxiliary storage device 42 or 44.

When a TOC block in first auxiliary storage device 42 is replaced by another TOC block, state information for the SOC block containing the replaced TOC block is updated by reducing the corresponding count value of counter field 61 by 1.

In the above, the count value of 0 from counter field 61 show that no TOC block that is in the SOC block corresponding to the entry is currently stored in first auxiliary storage unit 42 and indicates that a SOC block should be fetched if there is a cache miss. However, another value can mark the boundary between fetching an SOC block or a TOC block from the lower level memory device 48. For example, the value set to be the upper limit for the determination can be selected among values from 1 to the number obtained by dividing the block size of the second information 402 by the block size of the first information 401. In the case that the upper limit is set and used, when a cache miss is generated, central controller 40 uses the information of the state storage device 46a as the basis of determination for determining the size of the information block fetched from lower level memory device 48 in the above embodiment.

However, when the upper limit is set by the number obtained by dividing the block size Bsoc of a SOC block by the block size Btoc of a TOC block, it is not necessary to include the state storage device 46a since an SOC block is always fetched from lower level memory device 48. Therefore, when a cache miss is generated, SOC block including the data item to be referenced by central controller 40 is fetched from lower level memory device 48 and is stored in second auxiliary storage device 44, and the TOC block including the target data is copied from second auxiliary storage device 44 to first auxiliary storage device 42. Central controller 40 can access the target data item from auxiliary storage device 42 or 44.

In another embodiment, when a cache miss is generated, a SOC block or TOC block is selectively fetched from the lower lever memory device 48 according to whether the TOC block which does not include the target data and is included in the SOC block including the target data is in the auxiliary storage device and the fetched block is selectively stored in the auxiliary storage device.

When the SOC block including the target data is fetched in response to a cache access miss, the TOC block including the target data and the other TOC blocks in the SOC block are stored to have different replacement states according to the associativity of the auxiliary storage device. Namely, when the associativity of the auxiliary storage device is equal to or greater than 2, the TOC block including the target data item to be referenced by the central controller 40 is stored to have replacement information to be replaced most lately in the same associated set. The other TOC blocks are stored to have replacement information to be replaced early in the concerned associated set.

Figure 9:
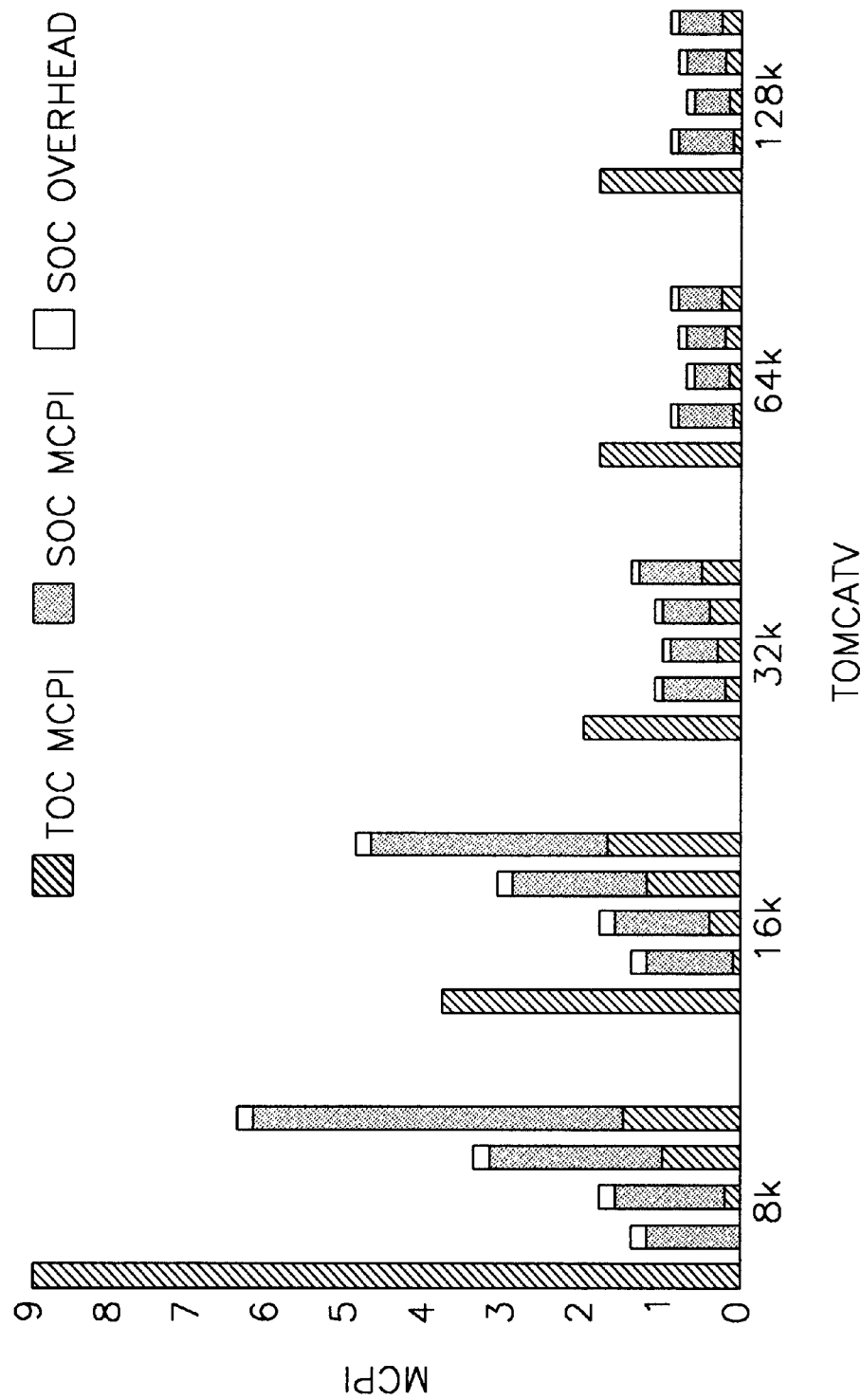
FIG. 9 shows comparison of performances of cache memories with each other.

FIG. 8 shows the system parameters for an embodiment of the present invention. FIG. 9 shows comparison of performances of the cache memory. As shown in FIGS. 8 and 9, the memory cycles per instruction MCPI represented in the following equation for comparison of the performance of the cache memory according to the present invention with the performance of another cache memory system.

$$\begin{aligned} MCPI &= \text{(Total number of delayed cycle due to data references)}/\text{(Total number of data references)} \\ &= \text{(Number of miss} * \text{miss penalty)}/\text{(Total number of data references}) \\ &= \text{miss ratio} * \text{(latency} + \text{block size}/\text{transfer\_rate)} \end{aligned}$$

When a TOC block in the first auxiliary storage device 42 is replaced by a TOC block newly fetched from second auxiliary storage device 44 or lower memory 48, the TOC block included in an SOC block stored in second auxiliary storage device 44 is updated only when the SOC block including the replaced TOC block is stored in second auxiliary storage device 44 and the replaced TOC block is modified in first auxiliary storage device 42 and has a value different from that of the TOC block in the SOC block stored in second auxiliary storage device 44.

In the hierarchical memory structure, when a cache miss is generated, central controller 40 uses the information from storage device 46a as the basis for determining the size of the information block fetched from lower level memory device 48 in the preferred embodiment. However, whether the TOC block and the SOC block including the target data for the central controller 40 is in lower level memory device 48 can be used as the basis of determination instead of the information for state storage device 46a. For example, when lower memory device 48 includes a cache, the SOC block, rather than a TOC block, can be fetched from lower memory device when lower memory device experiences a cache miss. Preferably, the size of the information block formed of a block or a page which is the basic unit of information in lower memory device 48 is larger than or equal to the size $B_{soc}$ of an SOC block.

In the present invention, first auxiliary storage device 42 is separated from the second auxiliary storage device 44 as a preferred embodiment. However, it is possible to include one auxiliary storage device without separating first auxiliary storage device 42 from auxiliary storage device 44 as another embodiment.

Performance evaluation is performed, changing the size and the structure of the caches, as shown in FIG. 8. A result of the performance evaluation of Tomcatv (Type: CFP95, Total data reference: 50,139,075) benchmark is shown in FIG. 9. In FIG. 9, the vertical axis denotes the MCPI and the horizontal axis denotes the size of the cache. The left most bar among the sets of bars corresponding to the different sizes of the respective cache memories denotes the MCPI of a conventional cache system having a block size of 32 bytes. The other four bars denote the MCPI when the size of the TOC block is set to be 32 bytes and the size of the SOC block is set to be 64, 128, 256, and 512 bytes. The sizes of the SOC (e.g., second auxiliary storage device 44) and the TOC (e.g., first auxiliary storage device 42) are set to be one half of the total cache capacity. The TOC is set to be a direct-mapped cache. The associativity of the SOC is set to be 8.

According to the present invention, the spatial locality and the temporal locality are exploited together by selectively determining the amount of information fetched upon a cache miss and selectively storing the fetched information according to the state of the information existing in the cache so that information having a high reference probability remains in the cache longer than information having a low reference probability. Accordingly, the number of cache misses is reduced and the efficiency of the memory traffic is increased. Therefore, the performance of the memory system is improved.

Although the invention has been described with reference to particular embodiments, the description is only an example of the invention's application and should not be taken as a limitation. Various adaptations and combinations of features of the embodiments disclosed are within the scope of the invention as defined by the following claims.

What is claimed is:

1. A method of accessing target data in a computer, comprising the acts of:

accessing the target data from a first auxiliary storage device if the target data is stored in a first information block stored in the first auxiliary storage device, or accessing the target data from a second auxiliary storage device if the target data is stored in a second information block stored in the second auxiliary storage device, wherein first information blocks each comprise a first block size, wherein second information blocks each comprise a second block size larger than the first block size, and wherein each second information block comprises a plurality of first information blocks; and fetching the target data from a lower level storage device if the target data is not stored in the first or second auxiliary storage devices, the target data being included in a specific first information block associated with a specific second information block stored in the lower level storage device;

wherein only the specific first information block is fetched and stored in the first auxiliary storage device if at least a particular number of first information blocks associated with the specific second information block are stored in the first auxiliary storage device; and wherein the specific second information block is fetched and stored in the second auxiliary storage device if less than the particular number of first information blocks associated with the specific second information block are stored in the first auxiliary storage device.

2. The method of claim 1, wherein the particular number is one.

3. The method of claim 1, further comprising the acts of:

storing state information comprising a number, the number being a quantity stored in the first auxiliary storage device of first information blocks associated with the specific second information block; and using the stored state information to fetch the target data.

4. The method of claim 1, wherein if the specific second information block is fetched, the specific first information block is copied into the first auxiliary storage device.

5. The method of claim 1, wherein the first and second auxiliary storage devices are cache memories.

6. The method of claim 1, wherein the lower level storage device is a magnetic disk drive, a magnetic tape device, a memory device, or a cache memory device.

7. The method of claim 1, wherein a maximum number of second information blocks capable of being stored in the second auxiliary storage device is smaller than a maximum number of first information blocks capable of being stored in the first auxiliary storage device multiplied with a ratio of an associativity of the second auxiliary storage device to an associativity of the first auxiliary storage device, the associativity of the second auxiliary storage device being larger than the associativity of the first auxiliary storage device.

8. The method of claim 1, wherein the second block size is a multiple of twice the first block size.

9. The method of claim 1 further comprising the acts of:

replacing in the first auxiliary storage device the specific first information block that has been stored with an updated version of the specific first information block; and if the specific second information block is stored in the second auxiliary storage device, copying into the specific second information block stored in the second auxiliary storage device the updated version of the specific first information block.

10. The method of claim 9, wherein the updated version of the specific first information block is copied into the specific second information block stored in the second auxiliary storage device only if the updated version of the specific first information block is different from the specific first information block stored as part of the specific second information block stored in the second auxiliary storage device.

11. The method of claim 1, wherein the lower level storage device comprises a first lower level storage device, and further comprising the acts of:

fetching from a second lower level storage device a second specific second information block comprising the target data if the target data is not stored in the first auxiliary storage device, in the second auxiliary storage device, or in the first lower level storage device;

storing in the second auxiliary storage device the fetched second specific second information block; and copying from the fetched and stored second specific second information block into the first auxiliary storage device a first information block that includes the target data.

12. A memory management system comprising:

first information blocks each having a first block size;

second information blocks each having a second block size larger than the first block size, wherein each second information block comprises a plurality of first information blocks associated with the second information block;

a first auxiliary storage device storing therein first information blocks;

a second auxiliary storage device storing therein second information blocks;

a lower level storage device; and a controller;

wherein the controller accesses target data from the first auxiliary storage device if the target data is stored in a first information block stored in the first auxiliary storage device, or accesses the target data from the second auxiliary storage device if the target data is stored in a second information block stored in the second auxiliary device; and wherein the controller fetches the target data from the lower level storage device if the target data is not stored in the first or second auxiliary storage devices, the target data being included in a specific first information block associated with a specific second information block stored in the lower level storage device, the controller fetching and storing in the first auxiliary storage device only the specific first information block if at least a particular number of first information blocks associated with the specific second information block are stored in the first auxiliary storage device, the controller fetching and storing in the second auxiliary storage device the specific second information block if less than the particular number of first information blocks associated with the specific second information block are stored in the first auxiliary storage device.

13. The system of claim 12, wherein the particular number is one.

14. The system of claim 12 further comprising state information, wherein the state information comprises a number indicating a quantity stored in the first auxiliary storage device of first information blocks associated with the particular second information block.

15. The system of claim 12, wherein the first and second auxiliary storage devices are cache memories.

16. The system of claim 12, wherein the lower level storage device is a magnetic disk drive, a magnetic tape device, a memory device, or a cache memory device.

17. The system of claim 12, wherein a maximum number of second information blocks capable of being stored in the second auxiliary storage device is smaller than a maximum number of first information blocks capable of being stored by the first auxiliary storage device multiplied with a ratio of an associativity of the second auxiliary storage device to an associativity of the first auxiliary storage device, the associativity of the second auxiliary storage device being larger than the associativity of the first auxiliary storage device.

18. The system of claim 12, wherein the second block size is a multiple of twice the first block size.

19. The system of claim 12, wherein the controller replaces in the first auxiliary storage device the specific first information block that has been stored with an updated version of the specific first information block, and if the specific second information block is stored in the second auxiliary storage device, copies into the specific second information block stored in the second auxiliary storage device the updated version of the specific first information block.

20. The system of claim 19, wherein the controller copies the updated version of the specific first information block into the specific second information block stored in the second auxiliary storage device only if the updated version of the specific first information block is different from the specific first information block stored as part of the specific second information block stored in the second auxiliary storage device.

21. The system of claim 12, wherein:

the lower level storage device comprises a first lower level storage device;

the controller fetches from a second lower level storage device a second specific second information block comprising the target data if the target data is not stored in the first auxiliary storage device, in the second auxiliary storage device, or in the first lower level storage device;

the controller stores in the second auxiliary storage device the fetched second specific second information block; and the controller copies from the fetched and stored second specific second information block into the first auxiliary storage device a first information block that includes the target data.

\* \* \* \* \*